June 17, 1930.    LE ROY S. DUNHAM    1,765,137
GALVANIC BATTERY
Filed July 3, 1926

INVENTOR
Le Roy S. Dunham
BY
Henry Lanahan
ATTORNEY

Patented June 17, 1930

1,765,137

UNITED STATES PATENT OFFICE

LE ROY S. DUNHAM, OF EAST ORANGE, NEW JERSEY, ASSIGNOR TO THOMAS A. EDISON, INCORPORATED, OF WEST ORANGE, NEW JERSEY, A CORPORATION OF NEW JERSEY

GALVANIC BATTERY

Application filed July 3, 1926. Serial No. 120,310.

My invention relates to galvanic batteries and more particularly to that type of primary batteries in which a negative electrode consisting of an element or elements of oxid of copper, and a positive electrode consisting of an element or elements of zinc, are disposed in a caustic alkaline electrolyte. By the term "positive electrode" as used herein, I mean the electrode from which current flows through the electrolyte to the other or negative electrode.

The negative electrode elements of batteries of this type commonly comprise plates or cylinders made of agglomerated masses of oxid of copper. As oxid of copper is, in itself, a very poor conductor, it has been customary to provide such electrode elements with thin coatings or surface films of copper or other suitable conductive material in order to insure proper conductivity between the elements and their supporting members or frames and to render the elements themselves of sufficient conductivity to enable a battery provided with one or more of such elements to supply current substantially of the strength which the battery is designed to generate, to the battery circuit immediately upon or very shortly after closing the latter. The copper oxid elements are usually provided with such thin surface coatings or films of copper by reducing the surface portions thereof. However, these thin conducting surface coatings or films on the copper oxid elements, especially when consisting of copper, are not altogether satisfactory. Copper readily oxidizes when wet, and the copper coating formed on a copper oxid element in the manner described, being thin and also somewhat porous, is subject to a marked degree to attack and oxidization in manufacture, in transit and in use. From the foregoing it will be apparent that by the time a copper oxid element having such a coating, is ready to be used, the conductivity of such coating will quite likely be greatly reduced and the coating will be subjected to further oxidation upon being immersed in the electrolyte. Consequently when the circuit of a battery equipped with such element is first closed, the efficiency of the battery will be low due to the imperfect condition of the copper surface coating or film of said element, and some time will elapse before the battery supplies the circuit with the full strength of current which it is designed to generate. Moreover under some conditions of use of such a battery the copper coating of the negative element remains in an imperfect and incomplete condition for an indefinite time and consequently the efficiency and operation of the battery are more or less permanently impaired.

The principal object of my invention is to provide in a galvanic battery, particularly one in which the elements comprise copper oxid and zinc as described, an improved construction and arrangement whereby the foregoing objections are obviated and it is insured that immediately upon or very shortly after the circuit of the battery is closed such battery will supply the circuit with the full strength of current for which the battery is designed.

Another object of my invention is to provide in a primary battery of the type described means whereby there will be a reduction of a limited amount of the copper oxid of the negative element to metallic copper immediately upon immersing the negative element into the electrolyte, thus causing an otherwise imperfect conductive surface film to become effective by the presence of the copper thus reduced.

A further object of my invention is to provide an arrangement whereby in a primary battery structure such as described wherein the negative copper oxid element is provided with a thin surface coating or film of metallic copper, such coating of copper will be protected against the corrosive oxidizing action of the caustic alkaline solution when the electrode element assembly is immersed in such solution in setting up the cell.

More specifically described my invention consists in maintaining a member formed of material more electro-positive than copper in good electrical connection with the copper oxid element or elements of the negative electrode of a battery such as described. While this member may be formed of various metals such as aluminum and zinc, I prefer to form the same of zinc.

Other objects and features of my invention will be hereinafter more fully described and claimed.

In order that my invention may be more clearly understood attention is directed to the drawing accompanying and forming part of this specification, and in which:—

Figure 1:
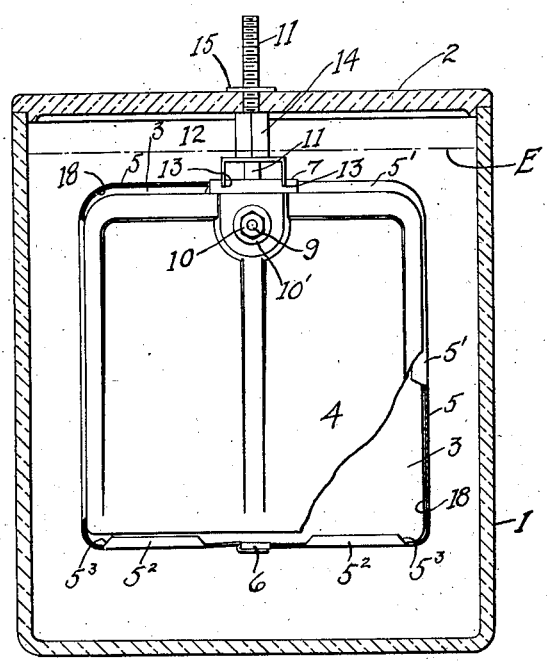
Fig. 1 is a central vertical sectional view, partly in elevation and partly broken away, of a primary battery embodying my invention.
Figure 2:
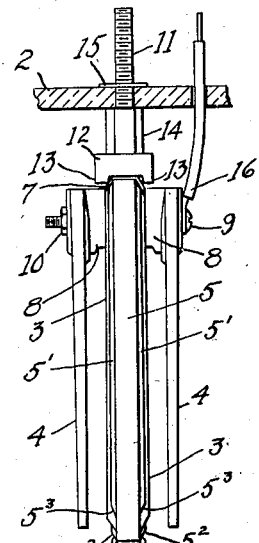
Fig. 2 is a view similar to Fig. 1, but at right angles thereto and with the battery jar or container omitted.
Figure 3:
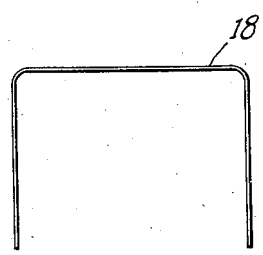
Fig. 3 is a view in side elevation on a reduced scale of the metal strip which is maintained in contact with the top and side edges of the negative electrode element of the battery structure shown in Figs. 1 and 2.
Figure 4:
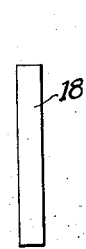
Fig. 4 is a view looking from the right in Fig. 3.

Referring to the drawing and especially to Figs. 1 and 2, reference character 1 represents an ordinary battery jar or container, preferably formed of glass, provided with the usual cover 2, which is also preferably formed of glass or other insulating material such as porcelain. The electrode element assembly of the battery comprises the negative oxid of copper plate 3 and two zinc plates 4, the negative plate 3 being disposed between the zinc plates 4 and being spaced and insulated therefrom. Reference character 5 represents a hanger or frame for carrying the negative plate 3, this frame preferably being formed of a strip or sheet of copper-plated iron or steel. The hanger 5 is preferably channel-shaped in cross section and tightly embraces all four edge portions of the plate 3. The flanges 5' of the sections of the hanger which embrace the side edge portions of the plate 3 are preferably respectively continuous with the flanges of the section thereof which embrace the top edge portion of the plate, but are preferably separated from the flanges 5² of the section of the hanger embracing the bottom edge portion of the plate by cut-away portions 5³, which cut-away portions are provided so as to enable the strip 5 to be readily bent around the lower corners of the plate 3. The flanges 5² terminate somewhat short of the ends of the strip 5, the said ends being secured firmly together as indicated at 6 as by providing one end with a loop or eye through which the other end of the strip is extended and then turned over.

The plate 3 is provided centrally thereof and at its upper end with a rectangular notch or recess 3' and with depressions 3² in the opposite faces thereof about said notch 3'. Reference character 7 indicates a member preferably formed of copper-plated iron or steel which is channel-shaped in cross section, this member being mounted on the top portion of the plate 3 centrally of the latter so as to embrace the central portion of the top section of the frame 5 with its side walls or flanges respectively disposed in the depressions 3² of the plate 3, the arrangement preferably being such that when the member 7 is disposed in this position the outer surfaces of the side walls thereof will be respectively substantially flush with the corresponding surfaces of the plate 3. The said walls of the member 7 are provided with rectangular openings 7' somewhat smaller than but registering with the notch or recess 3' of the plate 3. Insulating blocks 8, preferably formed of porcelain, are provided with reduced inner end portions (not shown) which extend through the openings 7' in the member 7 and into the notch 3' of the plate 3. The zinc positive plates 4, 4 are respectively disposed at the opposite sides of the negative copper oxid plate 3 in spaced relation thereto, these zinc plates being supported from the plate 3 by a bolt or rod 9 extending through the plates 3 and 4, the insulating blocks 8 and the member 7. The parts are rigidly secured together with the zinc plates 4, 4 spaced and insulated from the negative plate 3, by tightly turning up the nut 10 which is threaded onto one end of the rod 9. Suitable washers, only one of which is shown at 10', are disposed on the rod 9 between the head of the rod and the adjacent plate 4 and between the nut 10 and the other plate 4. The plates 3 and 4, the supporting frame 5 for the plate 3 and the means connecting the plates 4 with the plate 3 form a unitary structure or element assembly adapted to be supported from the cover 2 of the jar or container 1 by a single rod or bolt or other suitable suspension means.

For supporting the battery element assembly from the cover 2, I preferably employ a screw-threaded rod or bolt 11 having a rectangular head 11'. The frame 5 and the member 7 are provided with registering openings, and the rod 11 is positioned with its head 11' disposed within the notch 3' of the plate 3 and with the stem thereof extending upwardly through said openings. The flanges of that portion of the frame 5 crossing the notch 3' are bent inwardly as indicated at 5⁴, so that when the rod 11 is in its uppermost position with the head 11' thereof within the channel of the frame and engaging the under surface of the base thereof, said inwardly bent portions 5⁴ will coact with the head of the rod 11 to prevent turning of the latter.

Figure 5:
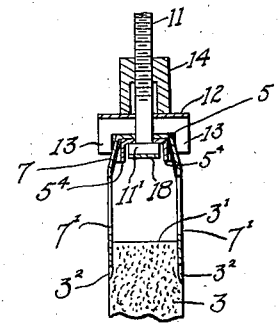
Fig. 5 is an enlarged detailed central sectional view of the upper portion of the negative electrode element showing the means for securing the supporting rod or bolt thereto.

Loosely mounted on the stem of the rod 11 is a clamping member 12 formed of copper or copper-plated iron or steel, said member being in the form of a yoke and having downwardly extending end portions. Each of the end portions of member 12 is recessed on its lower edge to provide a pair of spaced projections 13 and a seat therebetween for the member 7. An elongated nut 14 is threaded on the rod 11 above the clamping member 12, and when this nut is turned up tightly to the position shown in Figs. 1, 2 and 5, the clamping member 12 will be forced downwardly to a position in which the walls of the recesses in the lower edges of the end portions thereof tightly engage the member 7 with each of the pairs of projections 13 of such end portions respectively disposed on opposite sides of the member 7, and the head 11' of the rod will be firmly engaged with the inner surface of the base of the frame 5. The battery element assembly and the parts thereof will then be firmly held against movement relative to the rod 11. The rod 11 extends through an opening in the cover 2 and a nut 15 threaded on the upper extending end portion of the rod is turned up into engagement with the top of the cover 2 to bring the upper end of the nut 14 into tight engagement with the under surface of the cover. The battery element assembly is thus rigidly supported from the cover 2. The bolt or threaded rod 11 constitutes one terminal of the battery, it being electrically connected with the negative plate 3. The other terminal of the battery, as shown, consists of a conductor 16 extending through an aperture provided therefor in the cover 2 and secured to the rod 9, which is electrically connected to both of the positive plates 4, between the head of said rod and the adjacent plate 4.

The battery element assembly is immersed in a caustic alkaline solution, preferably a solution of sodium hydroxide, the level of which is maintained at a point E somewhat above the top edges of the plates 3 and 4.

Reference character 18 represents a member formed of a metal more electro-positive than copper which is suitably maintained in good electrical contact with the copper oxid plate 3. This member 18 may be formed of any metal which is soluble in the electrolyte and is more electro-positive than copper such, for example as aluminum or zinc, but the same is preferably formed of rolled zinc and is preferably in the form of a U-shaped strip of such a size and length as to embrace the top and side edges of the plate 3. The member or strip 18 is preferably of substantially the same width as the edges of the plate 3 and is preferably positioned between the top and side edges of the plate 3 and the base of the corresponding sections of the frame 5 in which the plate is mounted. With this construction the zinc strip is held in good electrical contact with outer surface portions of the negative plate 3, the amount of zinc and therefore the extent of its action can readily be controlled, the strip cannot become displaced to a position in which it will contact either of the zinc plates 4, and said strip is completely hidden from view.

The zinc strip 18 has no effect and does not begin to function until the battery is set up. When, however, the battery is set up with the plates immersed in the electrolyte a local action is immediately set up between the copper oxid of the plate 3 and the strip of metallic zinc. The nature of this action is two-fold. In the first place, the corrosive oxidizing action of the caustic soda solution is exerted almost entirely on the zinc strip 18 and accordingly affords protection to the thin copper film or coating on the oxid plate 3. This is in accordance with the general rule that when two dissimilar metals are disposed in an electrolyte the one most readily attacked or dissolved will be completely consumed before the other is attacked at all. The zinc thus serves to protect the copper surface coating or film of the plate 3 against damage and oxidation by the battery solution. In the second place, the zinc strip 18 forms a short-circuited couple with the copper oxid of the plate 3, causing the zinc to dissolve and resulting in the reduction of a definite amount of the copper oxid of the plate to metallic copper, viz. an amount equivalent to the amount of zinc dissolved. The zinc strip 18 disposed as described therefore serves to counteract all destructive effects to which the copper surface coating of the negative element of a battery, such as described, is subjected when the battery is set up, and also insures the copper oxid negative element of the battery being provided with uniform and uninterrupted surface coatings of metallic copper at the time when or shortly after the battery goes into use with a resultant efficient operation of the battery throughout its life.

While the zinc strip or equivalent means is particularly adapted for use in connection with negative electrode elements formed of agglomerated masses of copper oxid or the like and provided with surface coatings or films of metallic copper, it is also advantageous to employ such means where the surfaces of the negative elements are not initially reduced to or provided with conductive coatings, where conductive surface coatings other than copper, graphite, for example, are employed, and also where the negative elements are of the type wherein a mass of loose copper oxid or the like is disposed in a basket or other suitable perforated container.

It is to be understood that my invention is applicable to batteries wherein electrolytes other than those consisting of caustic alkaline solutions are employed. It is also to be understood that the structure specifically shown and described herein constitutes merely a preferred embodiment of my invention and is subject to various changes and modifications without departure from the spirit of my invention and the scope of the appended claim.

Having now described my invention, what I claim as new and desire to protect by Letters Patent is, as follows:

A galvanic cell comprising electrolyte, electrode elements disposed in the electrolyte, one of said elements comprising a plate formed of oxid of copper, supporting means for said plate comprising a U-shaped frame which is channel-shaped in cross section and which embraces the top and side edge portions of the plate, and a U-shaped strip separate from said plate and supporting means disposed between the bottom of the channel of said frame and the top and side edges of the plate, said strip being formed of material which is soluble in said electrolyte and more electro-positive than copper, substantially as described.

This specification signed this 25th day of June, 1926.

LE ROY S. DUNHAM.